(12) United States Patent  (10) Patent No.: US 8,376,575 B1
Millikan  (45) Date of Patent: *Feb. 19, 2013

(54) LIGHT EMITTING DIODE OPTICAL SYSTEM AND RELATED METHODS

(75) Inventor: Bart Millikan, Gilbert, AZ (US)

(73) Assignee: Tomar Electronics, Inc., Gilbert, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/287,029

(22) Filed: Nov. 1, 2011

Related U.S. Application Data (63) Continuation of application No. 12/468,583, filed on May 19, 2009, now Pat. No. 8,047,675.

(51) Int. Cl.
*F21V 7/04* (2006.01)
*F21V 7/06* (2006.01)

(52) U.S. Cl. ........ 362/241; 362/555; 362/245; 362/247; 362/307; 362/327

(58) Field of Classification Search .................. 362/241, 362/555, 235, 237, 245, 247, 307, 308, 310, 362/299, 300, 301, 311.02, 327, 329, 331
See application file for complete search history.

(56) References Cited

U.S. PATENT DOCUMENTS

| | | | |
|---|---|---|---|
| 6,527,411 B1 * | 3/2003 | Sayers ........................ | 362/245 |
| 6,547,423 B2 | 4/2003 | Marshall et al. | |
| 6,679,621 B2 | 1/2004 | West et al. | |
| 6,724,543 B1 | 4/2004 | Chinniah et al. | |
| 7,083,313 B2 | 8/2006 | Smith | |
| 7,172,325 B2 * | 2/2007 | Kim et al. ...................... | 362/561 |
| 7,246,917 B2 | 7/2007 | Rhoads et al. | |
| 7,306,351 B2 | 12/2007 | Chao et al. | |
| 7,390,109 B2 | 6/2008 | Li et al. | |
| 7,410,274 B2 * | 8/2008 | Nagabuchi .................... | 362/332 |
| 7,433,134 B2 | 10/2008 | Chou et al. | |
| 7,438,445 B2 | 10/2008 | Shiau et al. | |
| 7,458,703 B2 | 12/2008 | Han et al. | |
| 7,473,937 B2 | 1/2009 | Park et al. | |
| 7,554,742 B2 * | 6/2009 | Chinniah et al. .............. | 359/641 |
| 7,850,334 B2 * | 12/2010 | Holder et al. ................. | 362/227 |
| 7,938,559 B2 * | 5/2011 | Angelini et al. .............. | 362/241 |
| 8,047,675 B1 * | 11/2011 | Millikan ....................... | 362/241 |

\* cited by examiner

*Primary Examiner* — Bao Q Truong
(74) *Attorney, Agent, or Firm* — Booth Udall Fuller, PLC (57) ABSTRACT

A light emitting diode (LED) optical system. Implementations disclosed in this document may include two or more LEDs coupled with a circuit board and two or more optics. The two or more optics may each include a first end and a second end where the second end opposes the first end and a first optical stage including the first end. A second optical stage may be included that includes the second end. The first optical stage may include a total internal reflector and the second optical stage may include an upper reflector portion located at the second end. The two or more optics may be coupled over the two or more LEDs at their first ends and the two or more optics may be coupled to each other along a portion of their first optical stages and at their second optical stages.

20 Claims, 6 Drawing Sheets

LIGHT EMITTING DIODE OPTICAL SYSTEM AND RELATED METHODS

CROSS REFERENCE TO RELATED APPLICATIONS

This is a continuation application of patent application Ser. No. 12/468,583, to Millikan filed May 19, 2009 and titled "LIGHT EMITTING DIODE OPTICAL SYSTEM AND RELATED METHODS," issuing as U.S. Pat. No. 8,047,675 on Nov. 1, 2011, the disclosure of which is hereby incorporated herein in its entirety by this reference.

BACKGROUND

1. Technical Field

Aspects of this document relate generally to optical systems such as optics used for transmitting, projecting, or reflecting light for light emitting diodes (LEDs).

2. Background Art

The use of light emitting diodes (LEDs) as light sources in a wide variety of applications is well known. Lighting systems employing a wide variety of LED optical systems have been devised to direct the light emitted by one or more LEDs in a desired direction. Because light is naturally emitted by most LEDs in a broad angular pattern, conventional LED optical systems utilize collimation or focusing optics to gather the light emitted and direct it to form a desired light pattern. In systems where light is desired to be directed primarily laterally from the LED, turning mirrors or specialized side-emitting LEDs are sometimes be employed.

SUMMARY

Implementations of light emitting diode (LED) optical systems disclosed in this document may include two or more LEDs coupled with a circuit board and two or more optics. The two or more optics may each include a first end and a second end where the second end opposes the first end and a first optical stage including the first end. A second optical stage may be included that includes the second end. The first optical stage may include a total internal reflector and the second optical stage may include an upper reflector portion located at the second end. The two or more optics may be coupled over the two or more LEDs at their first ends and the two or more optics may be coupled to each other along a portion of their first optical stages and at their second optical stages.

Implementations of LED optical systems may include one, all, or any of the following:

The upper reflector portions of the second optical stages of the two or more optics may combine to form an upper reflector.

The upper reflector may be configured to emulate a point light source for an outer lens coupled over the LED optical system using light emitted from the two or more LEDs.

The upper reflector of the second optical stage may be configured to produce a substantially lateral light pattern when an outer lens is coupled over the LED optical system. The outer lens may be a Fresnel lens.

The two or more optics may be symmetrically coupled along a portion of their first optical stages and at their second optical stages.

The LED may be a Lambertian radiation pattern LED.

The two or more optics may each include an opening configured to receive the two or more LEDS where the openings each taper into the two or more optics from a first opening diameter to a second opening diameter.

The upper reflector portions may include a stack having at least one of aluminum, silver, gold, and chromium.

The upper reflector portions may include a stack including at least one of a material with a higher index of refraction than a material included in the two or more optics and a material with a lower index of refraction than a material included in the two or more optics.

Implementations of an optic for a light emitting diode (LED) optical system may include a first optical stage including a plurality of total internal reflectors coupled together along a portion of a side of each total internal reflector of the plurality of total internal reflectors and a second optical stage including an upper reflector formed by coupling together a plurality of petal shaped upper reflector portions. Each petal shaped upper reflector portion of the plurality of petal shaped upper reflector portions may oppose each total internal reflector of the plurality of total internal reflectors. The upper reflector may oppose a plurality of openings in the first optical stage and the plurality of openings in the first optical stage may be configured to couple over a plurality of LEDs.

Implementations of an optic for an LED optical system may include one, all, or any of the following:

Each of the plurality of openings in the first optical stage may taper into the first optical stage from a first opening diameter to a second opening diameter.

The plurality of petal shaped upper reflector portions may include a stack including at least one of aluminum, silver, gold, and chromium.

The plurality of petal shaped upper reflector portions may include a stack including at least one of a material with a higher index of refraction than a material included in the two or more optics and a material with a lower index of refraction than a material included in the two or more optics.

Implementations of an optic for a light emitting diode (LED) optical system may include a plurality of optics coupled together along at least one edge of each of the plurality of optics. Each optic may include an opening at a first end configured to couple over an LED and have a first opening diameter. A first surface may be included that expands outwardly from substantially the first opening diameter to a maximum width and a second surface may be include that tapers inwardly from the maximum width to an upper surface. The upper surface may be angled relative to a plane substantially parallel with the first opening diameter and the upper surfaces of each of the plurality of optics may be coupled together to form an upper reflector.

Implementation of an optic for an LED optical system may include one, all, or any of the following:

The opening in the first end may taper into the optic from a first opening diameter to a second opening diameter.

The plurality of optics may be symmetrically coupled along their at least one edge.

Implementations of light emitting diode (LED) optical systems and implementations of optics for LED optical systems like those disclosed in this document may utilize implementations of a method of distributing light from a plurality of LEDs. The method may include receiving light from a plurality of LEDs at a first optical stage of an optic coupled over the plurality of LEDs. The method may include focusing the light using total internal reflection on an upper reflector included in a second optical stage of the optic opposing the first optical stage where the upper reflector includes a plurality of petal shaped upper reflector portions. The method may also include reflecting the light from the second optical stage of the optic using the upper reflector.

Implementations of a method of distributing light form a plurality of LEDs may include one, all, or any of the following:

The method may include emulating a point light source for an outer lens coupled over the plurality of LEDs and the optic using the upper reflector.

The method may include generating a substantially lateral light pattern with the outer lens and the light from the plurality of LEDs.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended light emitting diode (LED) optical systems and/or assembly procedures for a LED optical system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such LED optical systems and implementing components, consistent with the intended operation.

Figure 1:
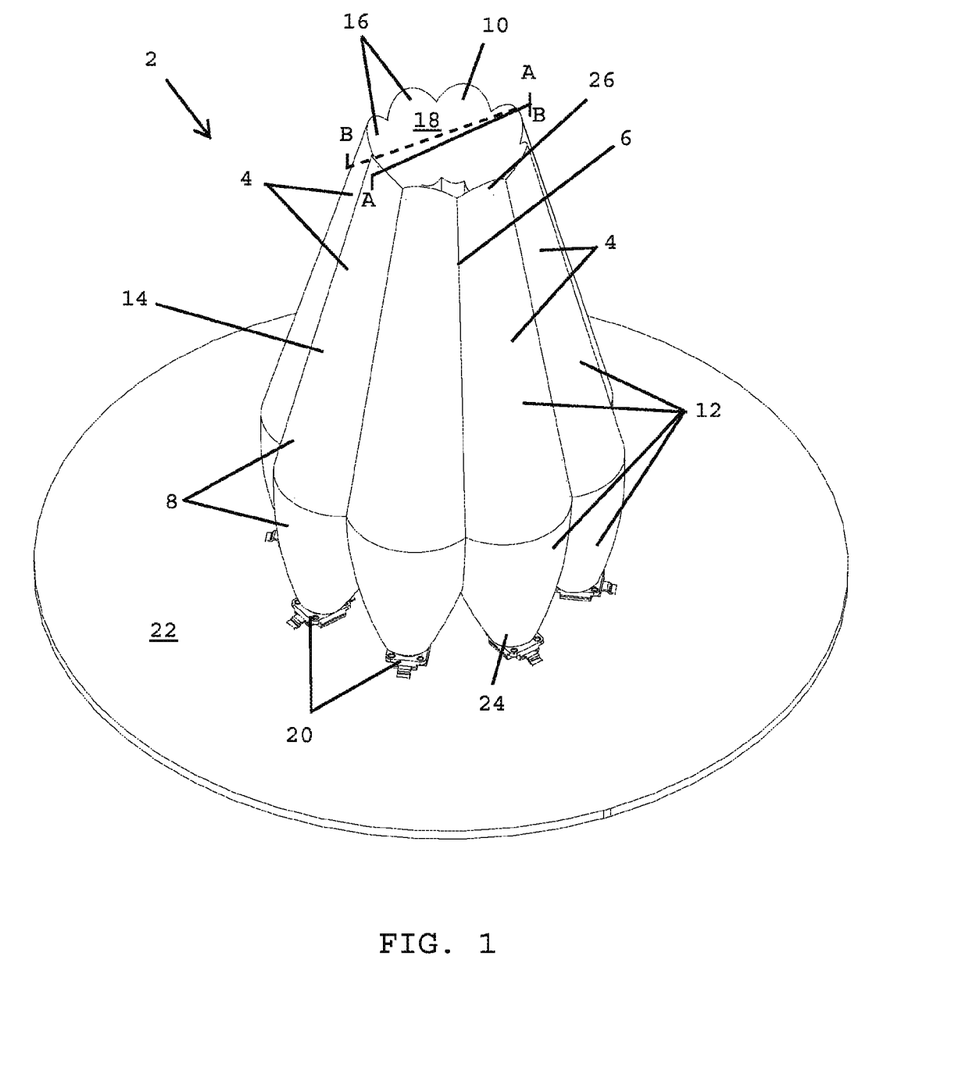
FIG. 1 is a perspective view of an implementation of an optic for a light emitting diode (LED) system showing sectional line A and sectional line B.

Referring to FIG. 1, an implementation of an LED optical system 2 is illustrated. The system 2 includes a plurality of optics 4 coupled together along a side 6 of each optic 4. Each of the optics 4 includes a total internal reflector (first optical stage) 8 and an upper reflector portion (second optical stage) 10. The plurality of total internal reflectors 8 forms a first optical stage 12 of an overall optic 14 formed by coupling the plurality of optics 4 together. As illustrated, the plurality of optics 4 are coupled together along a portion of their first optical stages 8. The plurality of upper reflector portions 10 distributing light from a plurality of LEDs 20, form a second optical stage 16 of the optic 14 and, when each second optical stage 10 of the individual optics 4 are coupled together at their second optical stages 10, an upper reflector 18 for the optic 14 is formed. The optic 14 is configured to couple over the plurality of LEDs 20 included on circuit board 22. As illustrated, each of the upper reflector portions or upper surfaces 8 may be petal shaped. As used in this document, petal shaped is used to describe a surface having a perimeter that is a closed shape containing at least two rounded edges. Each of the plurality of optics 4 includes a first end 24 and a second end 26 opposing the first end 24. The first ends 24 may be included in each optic's 4 first optical stage 8 and the second ends 26 may be included in each optic's 4 second optical stage 10 of the overall optic's 14 first optical stage 12 and second optical stage 16.

Figure 2:
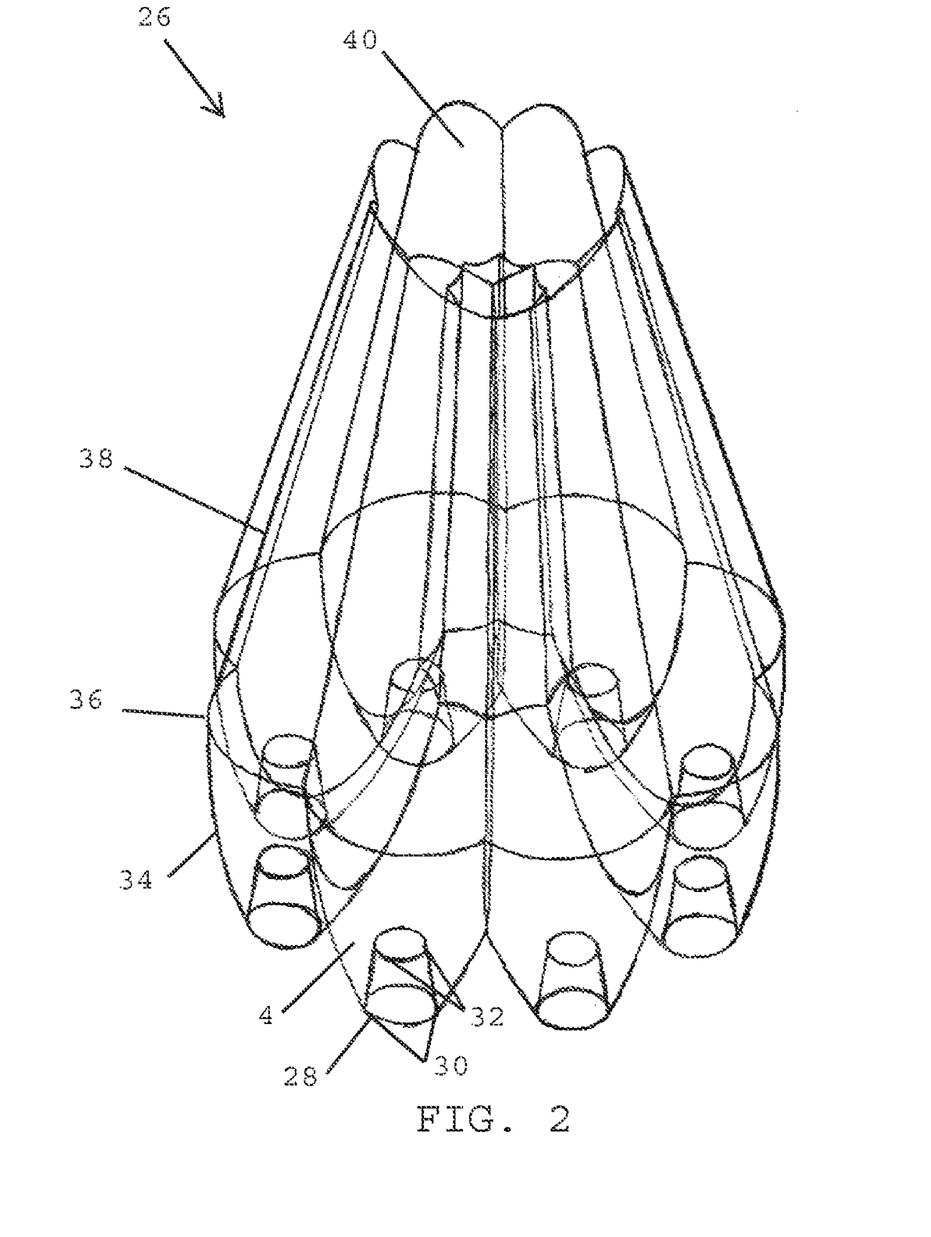
FIG. 2 is a perspective view of the optic implementation of FIG. 1 showing the internal structure of the optic.

Referring to FIG. 2, an implementation of an optic 14 for an LED optical system 2 like the implementation illustrated in FIG. 1 is shown in see-through with internal structural lines visible. As shown, the each of the plurality of optics 4 forming the overall optic 14 may have an opening 28 in its first end 24 (FIG. 1) that has a first opening diameter 30. The opening 28 may taper into the optic 4 from the first opening diameter 30 to a second opening diameter 32. While the implementation illustrated in FIG. 2 includes an opening 28 that tapers into the optic 4, in other particular implementations, the opening 28 may be only sized to receive the exposed portion or face of the LED on the circuit board 22 when the optic 4 is coupled over one of the plurality of LEDs 20. In particular implementations, the LEDs utilized may exhibit a Lambertian radiation pattern. Also, the LEDs utilized in particular implementations may include one or many chips packaged singly or together. For the implementation illustrated in FIG. 2, each optic 4 includes a first surface 34 that expands outwardly from the opening 28 toward a point along the optic 4 that has a maximum width 36. A second surface 38 tapers inwardly from the maximum width 36 to an upper surface or upper reflector portion 40.

Figure 3:
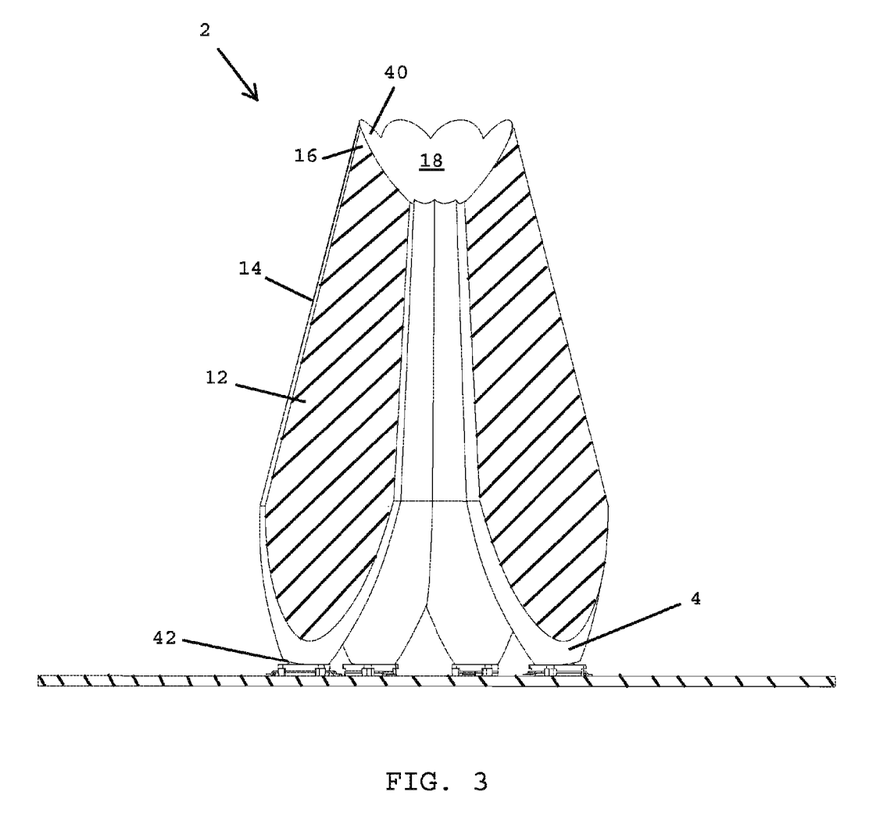
FIG. 3 is a cross sectional view of an implementation of an LED optical system with an optic like that illustrated in FIG. 1 taken along sectional line A in FIG. 1.

Referring to FIG. 3, a cross sectional view taken along sectional line A of FIG. 1 of the LED optical system 2 is illustrated. As illustrated, the upper surface 40 is shown angled relative to a plane 42 substantially parallel with the first opening diameter 30 (the plane 42 extending into the paper). Because each of the upper surfaces 40 associated with each optic 4 is angled across the width of the optic, the combination of all of the upper surfaces 40 forms an upper reflector 18 that sends light out from the combined upper reflector 18 in a substantially circular, spherical, or toroidal pattern. As can be observed in FIG. 3, the optics 4 may be symmetrically coupled along a portion of their respective first optical stages 8 and at their second optical stages 10. As is illustrated in FIG. 3, implementations of optics 14 may be formed as a solid piece. In particular implementations, each optic 4 may be formed separately and then coupled together. In other implementations, all of the optics 4 may be formed as a single integral piece. Also, any of a wide variety of forming methods may be used to construct implementations of optics 14, including, by non-limiting example, pultrusion, extrusion, forming, molding, injection molding, lathing, or any other forming process or method.

A wide variety of materials may be used to form optic implementations, including, by non-limiting example, plastics, glasses, crystals, or any other material capable of transporting light. The upper reflector 18 and upper reflector portions 10 (FIG. 1) (upper surfaces 40 in FIGS. 2 and 3) may include a stack, which may be an optimized stack, that includes aluminum, silver, gold, chromium, or any combination thereof. In other implementations, the stack may include a material with a higher index of refraction than the material included in the optics 4. In some implementations, the stack may include a material with a lower index of refraction than the material included in the optics 4. The stack may be formed as a coating on the surface of the upper reflector 18 and/or upper reflector portions 10 or may be coupled with the upper reflector 18 and/or upper reflector portions 10 as a separate piece or pieces.

Figure 4:
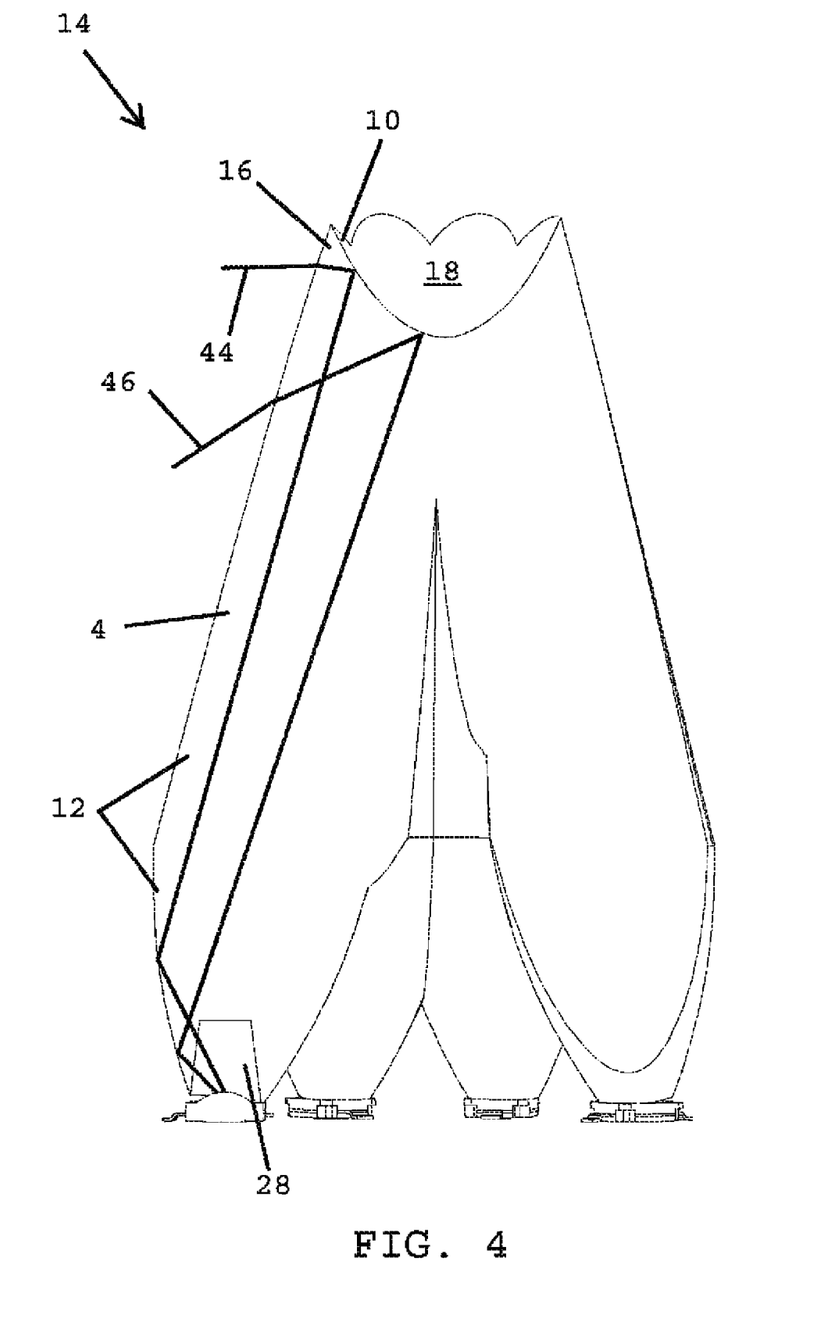
FIG. 4 is a cross sectional view of an implementation of an LED optical system illustrating the path of two light rays through the optic.

Referring to FIG. 4, another cross-sectional view of the optic 14 illustrated in FIGS. 1-3 taken along sectional line B of FIG. 1 is illustrated. The reflection paths for two light rays 44, 46 emitted from the LED through the optic 4 are shown. In particular implementations of LED optical systems 2, the first optical stage 8 of each optic 4 is a total internal reflector utilizing the principle of total internal reflectance to focus the light received from the LED on the upper reflector portion 10 in the second optical stage 10. Total internal reflectance occurs when the light emitted by the LED encounters the surface of the first optical stage 8 at an angle larger than a critical angle from a line normal to the surface and reflects from the surface internally within the optic 4. The conditions for total internal reflectance exist when the index of refraction of the material on the other side of the surface of the first optical stage 8 is either higher or lower than the material composing that portion of the optic 4. If light encounters the surface at an angle less than the critical angle, then some or all of the light will pass through the surface. Accordingly, if the shape of the total internal reflector of the optic 4 or each of the plurality of total internal reflectors included in a first optical stage 8 is properly shaped, substantially all of the light emitted in a dispersed pattern from the LED can be focused toward the upper reflector portion 10 by ensuring that substantially all of the light rays exiting the LED encounter the various surfaces of the first optical stage 8 at an angle greater than the critical angle. In particular implementations, implementations of openings 28 that extend into the optic 4 may be used to further refract the light emitted from the LED and aid in focusing it on the upper reflector portion 10.

Because of the use of a total internal reflector in the first optical stage 8 of each optic 4, the actual distance of the upper reflector portion 10 from the LED is adjustable by changing the angles and dimensions of the other portions of the optic 4. As a non-limiting example, the dimensions of a particular implementation of an optic 4 are listed as follows. The first opening diameter 30 may be 6.38 mm, the maximum width 36 may be 20.71 mm, and the diameter of the second opening diameter 32 may be 4.6 mm. The first surface 34 may be tilted from a line normal to an X/Y plane by −10 degrees and have a minimum front aper of 3 and a maximum front aper of 9. The front radius may be 1.5432939 the front conic value may be −1.1222637, the front $r^2$ coefficient value may be 0.020798396, the front $r^4$ coefficient value may be $-7.2715427*10^{-7}$, the front $r^8$ coefficient value may be $3.1562821*10^{-8}$, and the front $r^{10}$ coefficient value may be $2.9365197*10^{-10}$. The second surface 38 may be angled from a line normal to an X/Y plane at about 14.4 degrees. The upper surface 40 may have a prescription radius of −0.57451468, a conic value of −19.258158, an $r^2$ coefficient value of −0.00058919409, an $r^3$ coefficient value of 0.003200574, an $r^4$ coefficient value of $2.4803992*10^{-5}$, and $r^5$ coefficient value of $-6.1550322*10^{-7}$, an $r^6$ coefficient value of $-1.5803974*10^{-7}$, an $r^7$ coefficient value of $1.8049086*10^{-9}$, and an $r^8$ coefficient value of $3.1998108e-009*10^{-9}$.

Substantially all of the light received from the LED by the optic 4 may be emitted as it reflects from the upper reflector portion 10 and encounters the surface of the total internal reflector portion of the optic 4 at an angle less than the critical angle. Since the emission will occur generally in the area of the optic 4 surrounding the upper reflector portion 10, the combination of emissions from each of the plurality of optics 4 forming an optic 14 (from the upper reflector 18) may emulate a point light source, or, in other words, the light visible from implementations of LED optical systems 2 may resemble light emitted from a point location in a substantially spherical or toroidal pattern. The first stage 8 and second stage 10 of the optic 14, in combination with the upper reflector 18, also allow the transmission of the light from the plurality of LEDs on the circuit board to a predetermined distance above the circuit board, without requiring the use of mirrors or specialized assembly procedures for mounting the plurality of LEDs above the surface of the circuit board, though of course such mirrors or specialized assembly procedures could be used in particular implementations. The dimensions of each of the optics 4 and the overall design of the optic 14 can be designed to handle the light emission patterns of any of a wide variety of LED types, such as Lambertian emission pattern LEDs previously mentioned, and LEDs emitting any other type of emission pattern.

Figure 5:
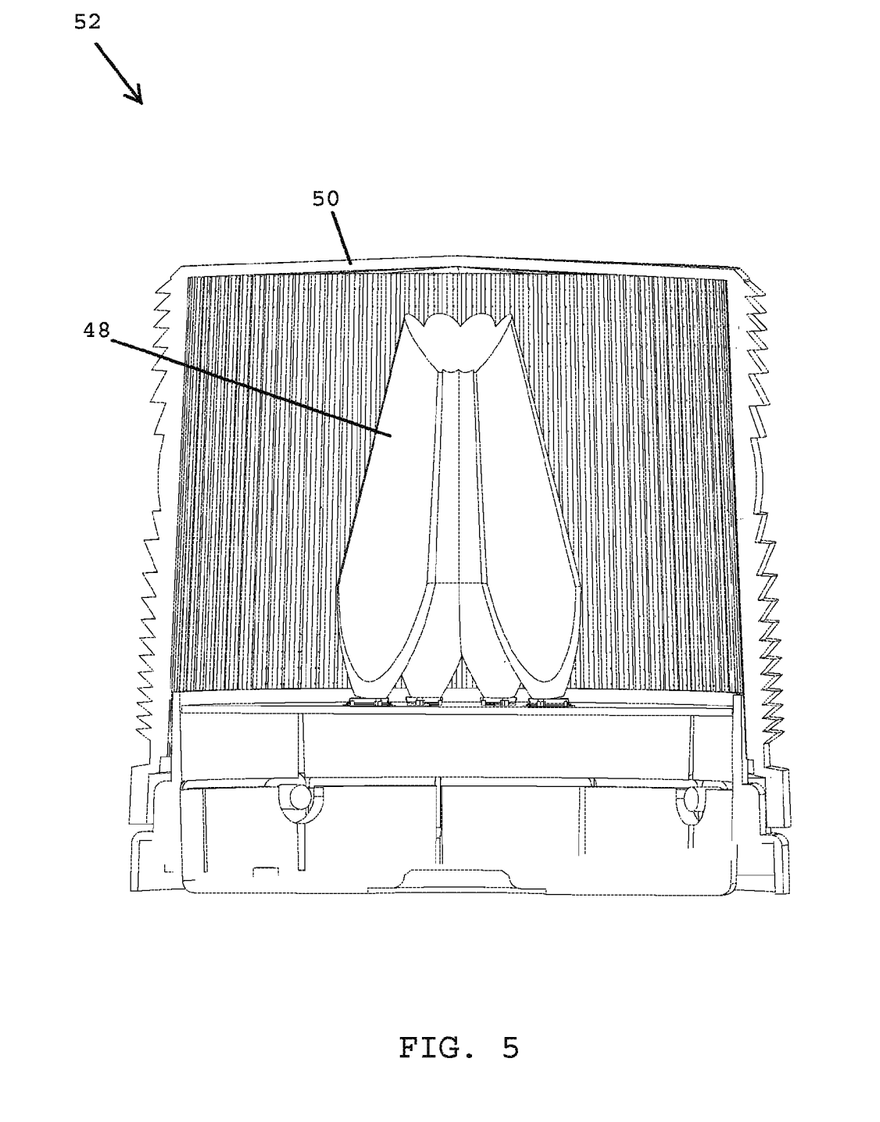
FIG. 5 is an implementation of an LED optical system with a outer lens coupled over it where the outer lens is a Fresnel lens.

Referring to FIG. 5, a cross sectional view of another implementation of an LED optical system 48 with an outer lens 50 coupled over it along with related components is illustrated. Because the LED optical system 48 may be configured to emulate a point light source, the system 48 may be used as a point light source for the outer lens 50. The outer lens 50 illustrated in FIG. 5 is configured to transmit the light received from the LED optical system 48 in a substantially lateral direction, thereby creating a laterally emitting LED optical device 52, operated using the light from, in particular implementations, two or more LEDs. However, many other implementations of outer lenses 50 could be used and many other optical components could be employed to direct the light in any other desired direction, pattern, or orientation. The outer lens 50 shown in the particular implementation of FIG. 5 is a Fresnel lens. In other implementations, any other type of lens (including a rotational Fresnel lens) capable of handling or directing the light may be utilized. Those of ordinary skill in the art will readily be able to determine desirable outer lens designs to create desired LED emission patterns using the principles disclosed in this document.

Figure 6:
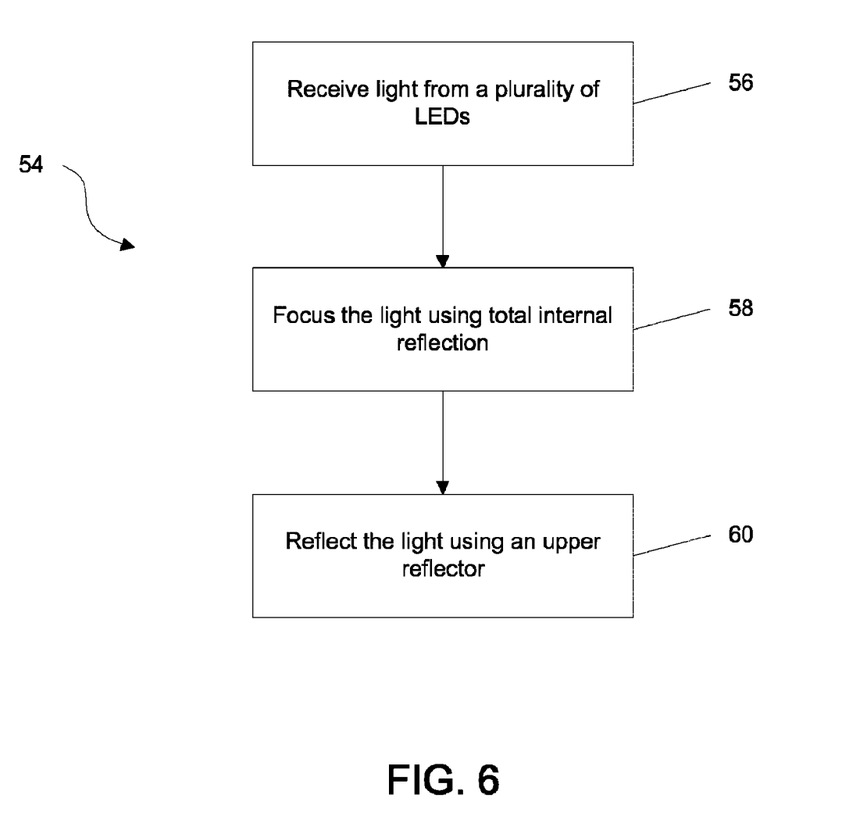
FIG. 6 is a flow diagram of an implementation of a method of distributing light from a plurality of LEDs.

Implementations of LED optical systems 2, 48 disclosed in this document may utilize implementations of a method of distributing light from an LED 54. Referring to FIG. 6, the method 56 may include receiving light from a plurality of LEDs (step 56), focusing the light using total internal reflection on an upper reflector (step 58), and reflecting the light using the upper reflector (step 60). In particular implementations, the upper reflector may be formed from a plurality of petal shaped upper reflector portions. The method may also include emulating a point light source for an outer lens coupled over the LED and generating a substantially lateral light pattern with the outer lens.

In places where the description above refers to particular implementations of LED optical systems and related methods it should be readily apparent that a number of modifications may be made without departing from the spirit thereof and that these implementations may be applied to other LED optical systems and related methods.

The invention claimed is:
1. An optical reflector comprising:
  two or more optics each comprising:
    a first end and a second end, the second end opposing the first end;
    a first optical stage including the first end, the first optical stage comprising a total internal reflector; and
    a second optical stage including the second end, the second optical stage comprising an upper reflector portion at the second end;

wherein each of the two or more optics is configured to couple over a light source at the first ends of the two or more optics; and wherein the two or more optics are coupled to each other along a portion of the first optical stages and at the second optical stages.

2. The optical reflector of claim 1, wherein the first optical stage further comprises a plurality of total internal reflectors coupled together along a portion of a side of each total internal reflector.

3. The optical reflector of claim 2, wherein the upper reflector portion at the second end of the second optical stage further comprises a plurality of petal shaped upper reflector portions each opposing at least one of the total internal reflectors.

4. The optical reflector of claim 1, wherein the upper reflector portions of the second optical stages of the two or more optics combine to form an upper reflector.

5. The optical reflector of claim 1, wherein the light source that each of the two or more optics is configured to couple over is a light emitting diode (LED).

6. The optical reflector of claim 5, wherein the LED is a Lambertian radiation pattern LED.

7. The optical reflector of claim 1, wherein the two or more optics are symmetrically coupled along a portion of the first optical stages and at the second optical stages.

8. The optical reflector of claim 1, wherein the upper reflector portions comprise a stack comprising at least one of aluminum, silver, gold, and chromium.

9. The system of claim 1, wherein the upper reflector portions include a stack comprising a material with a higher index of refraction than a material included in the two or more optics.

10. The optical reflector of claim 1, wherein the upper reflector portions include a stack comprising a material with a lower index of refraction than a material included in the two or more optics.

11. A method for producing an optical reflector, the method comprising:
    providing two or more optics each comprising:
        a first end and a second end opposing the first end;
        a first optical stage including the first end, the first optical stage comprising a total internal reflector; and
        a second optical stage including the second end, the second optical stage comprising an upper reflector portion at the second end;
    wherein each of the two or more optics is configured to couple over a light source at the first ends of the two or more optics; and
    coupling the two or more optics to each other along a portion of the first optical stages and at the second optical stages.

12. The method of claim 11, further comprising coupling a plurality of total internal reflectors together along a portion of a side of each total internal reflector within the first optical stage.

13. The method of claim 12, wherein the upper reflector portion at the second end of the second optical stage further comprises a plurality of petal shaped upper reflector portions each opposing at least one of the total internal reflectors.

14. The method of claim 1, wherein the upper reflector portions of the second optical stages of the two or more optics combine to form an upper reflector.

15. The method of claim 11, wherein the light source that each of the two or more optics is configured to couple over is a light emitting diode (LED).

16. The method of claim 15, wherein the LED is a Lambertian radiation pattern LED.

17. The method of claim 11, further comprising symmetrically coupling the two or more optics along a portion of the first optical stages and at the second optical stages.

18. The method of claim 11, wherein the upper reflector portions comprise a stack comprising at least one of aluminum, silver, gold, and chromium.

19. The method of claim 11, wherein the upper reflector portions include a stack comprising a material with a higher index of refraction than a material included in the two or more optics.

20. The method of claim 11, wherein the upper reflector portions includes a stack comprising a material with a lower index of refraction than a material included in the two or more optics.

* * * * *